(12) United States Patent
Yi et al.

(10) Patent No.: US 9,633,017 B2
(45) Date of Patent: Apr. 25, 2017

(54) DWELL-TIME BASED GENERATION OF A USER INTEREST PROFILE

(71) Applicant: Yahoo! Inc., Sunnyvale, CA (US)

(72) Inventors: Xing Yi, Milpitas, CA (US); Dilan Gorur, Mountain View, CA (US); Scott Gaffney, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 265 days.

(21) Appl. No.: 14/074,616

(22) Filed: Nov. 7, 2013

(65) Prior Publication Data
US 2015/0127662 A1    May 7, 2015

(51) Int. Cl.
G06F 17/30    (2006.01)

(52) U.S. Cl.
CPC .............................. G06F 17/30035 (2013.01)

(58) Field of Classification Search
CPC ................................................ G06F 17/30035
See application file for complete search history.

(56) References Cited

U.S. PATENT DOCUMENTS

| | | | | |
|---|---|---|---|---|
| 6,577,329 B1* | 6/2003 | Flickner | ................. | G06Q 30/02 715/774 |
| 8,311,950 B1* | 11/2012 | Kunal | ................. | G06Q 30/0201 705/319 |
| 2002/0087679 A1* | 7/2002 | Pulley | ................. | G06Q 30/02 709/224 |
| 2002/0130907 A1* | 9/2002 | Chi | ................. | G06F 17/30873 715/853 |
| 2006/0041562 A1* | 2/2006 | Paczkowski | ...... | G06F 17/30884 |
| 2006/0064411 A1* | 3/2006 | Gross | ................. | G06F 17/30864 |
| 2008/0077358 A1* | 3/2008 | Marvasti | ............. | G06N 99/005 702/187 |
| 2009/0006187 A1* | 1/2009 | Marcuvitz | ............. | G06Q 30/02 705/14.66 |
| 2009/0248661 A1* | 10/2009 | Bilenko | ............ | G06F 17/30864 |
| 2012/0245996 A1* | 9/2012 | Mendez | ............. | G06Q 30/0241 705/14.49 |
| 2013/0073546 A1* | 3/2013 | Yan | ................... | G06F 17/30321 707/732 |

\* cited by examiner

*Primary Examiner* — Kris Mackes
(74) *Attorney, Agent, or Firm* — Martine Penilla Group, L.L.P.

(57) ABSTRACT

A method is provided for building a user interest profile. According to the method, features of each of a plurality of articles are identified. For a given user, views of one or more of the plurality of articles are logged. For each view, a corresponding dwell time for the view by the given user is measured. A weight is applied to each view based on the corresponding measured dwell time. User interest scores for features of the articles are determined based on the weighted views, and the user interest profile is generated for the given user based on the user interest scores.

20 Claims, 4 Drawing Sheets

DWELL-TIME BASED GENERATION OF A USER INTEREST PROFILE

RELATED APPLICATIONS

The present disclosure is related to U.S. application Ser. No. 13/843,433, filed Mar. 15, 2013, entitled "Display Time of a Web Page," U.S. application Ser. No. 13/843,504, filed Mar. 15, 2013, entitled "Page Personalization Based on Article Display Time," and to U.S. application Ser. No. 13/836,758, filed Mar. 15, 2013, entitled "Method and System for Measuring User Engagement Using Scroll Dwell Time." The disclosures of these applications are herein incorporated by reference in their entirety for all purposes.

BACKGROUND

1. Field of the Invention

The present invention relates to methods and systems for generating a user interest profile.

2. Description of the Related Art

At present, Internet users enjoy access to vast quantities of information available through websites and their associated webpages. To provide an even better experience for users, website owners seek to customize the content of the webpages presented to users based on knowledge of the user's preferences, browsing history, and other information specific to each user. By acquiring a better understanding of a given user, a website owner can benefit by being able to provide relevant content and advertising to the user, and the user also benefits by receiving content that he or she is more likely to find engaging.

It is in this context that embodiments of the invention arise.

SUMMARY

Broadly speaking, embodiments of the present invention provide methods and systems for building a user interest profile. Several inventive embodiments of the present invention are described below.

In one embodiment, a method is provided for building a user interest profile, including the following method operations: identifying features of each of a plurality of articles; for a given user, logging views of one or more of the plurality of articles; for each view, measuring a corresponding dwell time for the view by the given user; applying a weight to each view based on the corresponding measured dwell time; determining user interest scores for features of the one or more of the plurality of articles based on the weighted views; generating a user interest profile for the given user based on the user interest scores; wherein the method is executed by at least one processor.

In one embodiment, the dwell time for a view of a given article defines a measured amount of time spent by the given user during active viewing of the given article.

In one embodiment, applying the weight to each view defines an increase or decrease in a value associated with the view that is based on the corresponding measured dwell time.

In one embodiment, applying the weight to each view is based on a logarithmic function of the corresponding measured dwell time.

In one embodiment, the user interest score for a given feature defines a level of interest for the given feature by the given user.

In one embodiment, the user interest profile is defined by features of the one or more of the plurality of articles and their associated user interest scores.

In one embodiment, the identified features include one or more of categories, entities, persons, locations, subjects, teams.

In one embodiment, the method further comprises: for a plurality of users, logging views of the plurality of articles; for each view by one of the plurality of users, measuring a corresponding dwell time for the view by the one of the plurality of users; applying a weight to each view by one of the plurality of users based on the corresponding measured dwell time of the one of the plurality of users; wherein determining user interest scores is based on the weighted views of the plurality of users.

In one embodiment, applying the weight to each view by one of the plurality of users is based on a logarithmic function of the corresponding measured dwell time of the one of the plurality of users.

In one embodiment, determining user interest scores includes: for a given feature, determining an overall probability that the plurality of users will view an article having the given feature; determining, for the given feature, an expected number of views by the given user based on the overall probability that the plurality of users will view an article having the given feature; determining an actual number of views of articles having the given feature by the given user; comparing the actual number of views to the expected number of views.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe systems and methods for building a user interest profile. It will be obvious, however, to one skilled in the art, that the present invention may be practiced without some or all of these specific details. In other instances, well known process operations have not been described in detail in order not to unnecessarily obscure the present invention.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In the present disclosure, methods and systems are described for using article-level (or page-level) dwell time, or user time spent, for pricing both guaranteed delivery (GD) display ads contracts and non-guaranteed delivery (NGD) display ads contracts in online display advertising. Methods and systems for determining dwell time are provided with reference to U.S. application Ser. No. 13/843,433, filed Mar. 15, 2013, entitled "Display Time of a Web Page," and U.S. application Ser. No. 13/843,504, filed Mar. 15, 2013, entitled "Page Personalization Based on Article Display Time," the disclosures of which are incorporated by reference.

Broadly speaking, systems and methods in accordance with the present disclosure leverage article-level dwell time information for building a user interest profile. Dwell time information provides a more accurate and fine-grained understanding of user engagement than conventional click or action-based measures of user engagement. Therefore, its application to various user interest models as discussed in further detail below serves to improve the quality of the user interest profile in representing the user's true interests. Compared with conventional methods and systems for user profile building and content selection, methods and systems in accordance with the present invention can provide users with improved content selections based on an improved user interest profile that is generated based on article-level dwell time understanding of the user.

Figure 1:
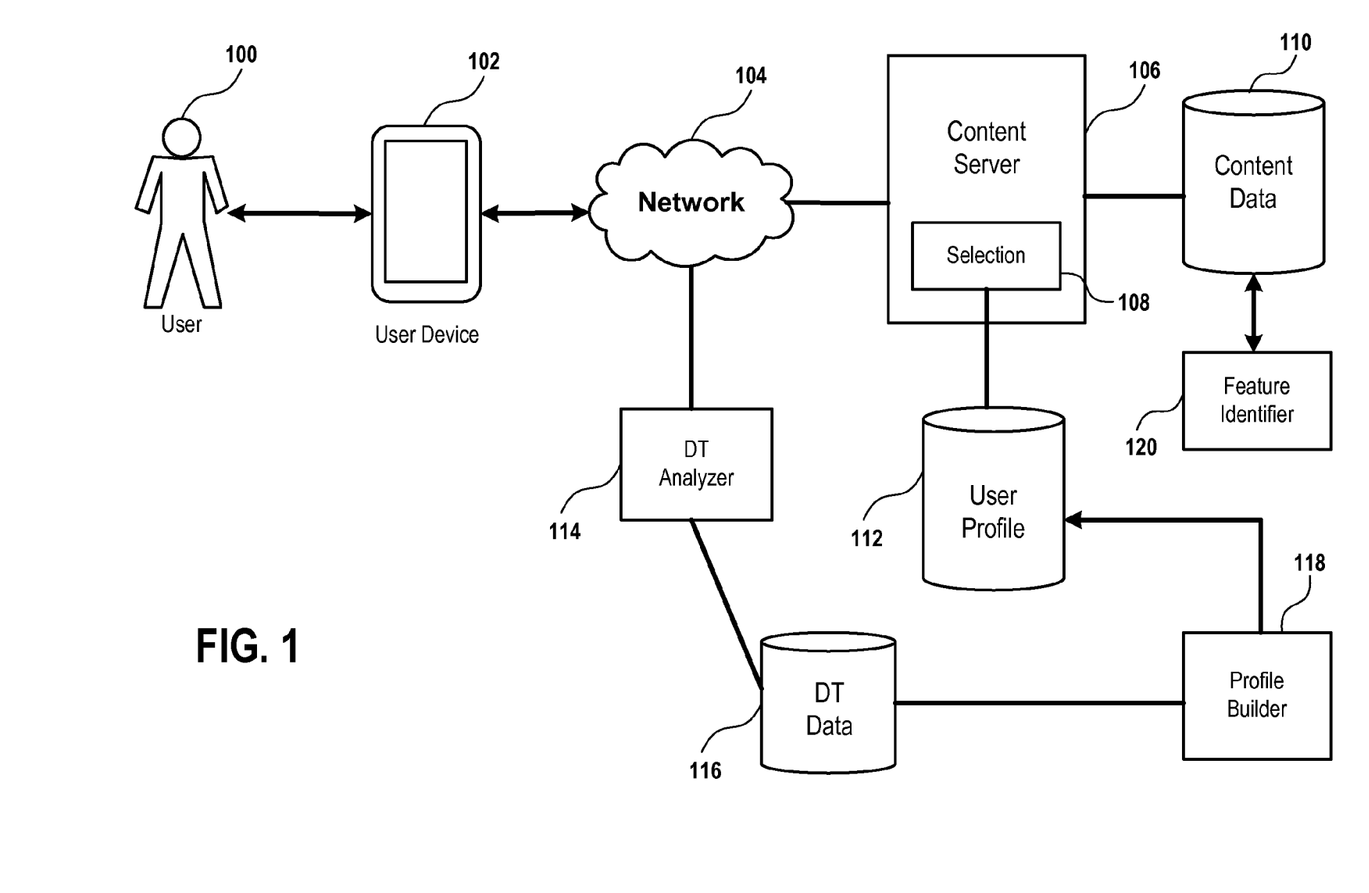
FIG. 1 illustrates a system for building a user interest profile, in accordance with an embodiment of the invention.

FIG. 1 illustrates a system for building a user interest profile, in accordance with an embodiment of the invention. In the illustrated embodiment, a user 100 operates a user device 102 to access content over a network 104. Broadly speaking, the network can be any kind of network capable of transmitting data, such as a local-area network (LAN), a wide-area network, (WAN), or the Internet, and may include wired or wireless networks or combinations thereof. A content server 106 is configured to serve content over the network for presentation on the user device 102.

The content server 106 may include a selection module 108 that is configured to identify content items from a content data storage 110 for recommendation or presentation to the user. Previews of the recommended content items can thus be presented to the user. The user may then select from amongst the content item previews a specific content item to access in its full form. It should be appreciated that content items can include any of various kinds of content which may be presented through a client device 102, such as articles, videos, images, and audio, by way of example and not by way of limitation.

Furthermore, it is noted that throughout the present specification, for purposes of illustrating principles in accordance with embodiments of the invention, reference is made to articles in particular as one example of a content item. However, the principles and methods described herein should not be understood as limited to articles only, but may be applied to any suitable content item, with appropriate modifications as needed which will be apparent to those skilled in the art.

Broadly speaking, an article is principally defined by a body of text, but may also include various other portions, such as a title/headline, summary, subheading, image, video, animation, audio, interactive applet or script, etc. An article can be a news story, editorial, review, or other type of article. A preview of an article may consist of its headline, a synopsis, an image, a text portion (e.g. first sentence or portion thereof), or any other portion or representative information which may preview the article. Hence, in accordance with embodiments of the invention, specific articles may be selected from a pool of articles for recommendation to a user, and the previews for the selected articles may be presented to the user, e.g. on a web page. The user may select one of the previews, and thereby navigate to, or otherwise access, the actual article in its entirety.

The selection of articles which are to be recommended or presented to a user can be based on a user interest profile associated with the user. Thus, in the illustrated embodiment, the selection module 108 is configured to access a user interest profile stored in a user profile storage 112, the user interest profile being associated with the user 100. The user interest profile defines various content features which are determined to be of interest to the user, and may also define a level of interest on the part of the user, or a weight, for a given content feature. In one embodiment, content items are ranked by applying the weights from the user profile of the specific user to features which are associated with the content items. In this manner, content items having features which are more highly weighted in the user profile will be ranked higher than content items having features which are less weighted (or non-existent) in the user profile. Based on the determined ranking, previews of the highest ranking content items can be presented to the user for selection.

It will be appreciated that the foregoing discussion relating to articles specifically may also apply to other types of content, such as videos, images, audio, and other types of content. Such content items can be selected from a pool of content items based on a user interest profile. Previews of the selected content items can be presented to the user, from which the user may select a given content item preview to access its corresponding content item in full. By way of example, a preview of a video might include a representative screenshot from the video, a title, a text summary of the contents of the video, etc.

A content feature can be broadly understood to encompass any kind of descriptive terms or items that may characterize a content item. By way of example, and not limitation, there may be various content feature types, including but not limited to, categories, entities, persons, locations, subjects, teams, events, dates, times, or any other feature which may fairly characterize a content item. Furthermore, feature types may encompass other types of noun-phrases, topics (explicit or latent), implicit latent factors in algorithms/models such as collaborative filtering algorithms, various content types (e.g. hard news, breaking news, celebrity/entertainment news, blogs, tweets, etc.), content provider names, content length, presentation type (e.g. text-only full text article, abstract, headline, all of the foregoing plus images, etc.), age of content at time of presentation, etc. It will be appreciated that there may be many other types of features in accordance with embodiments of the invention, and those specifically described herein are provided by way of example without limitation.

It should be appreciated that a content item may have many content features associated therewith. For example, an article about a baseball game may be determined to have features such as the following: category features which characterize the article as being a sports article, and more specifically, a baseball article; entity features which identify the teams mentioned in the article; person features which identify persons such as specific players that are mentioned in the article; location features which identify the hometown locations of the teams or a location where the game was played; etc. As another example, an article about a political election might be determined to have the following features: a category feature such as politics; a subject feature such as the election; person features such as the candidates in the election; a location feature identifying the location of the election related activity; etc.

It should be appreciated that the same term may be defined for different feature types. For example, an article about the city of San Francisco might be characterized as having both a subject feature and a location feature defined by the term "San Francisco." With continued reference to FIG. 1, a feature identifier 120 is provided for identifying or otherwise determining features of content items, and storing such features in association with their respective content items. It will be further appreciated that features of a content item such as an article may be identified by applying any of various processing techniques to the article. These may include methods for identifying keywords, pronouns, titles, headings, or any other aspects of an article that may be processed to define a feature which characterizes the article. Such methods may employ semantic analysis, natural language processing, or other technologies which may be applied to identify characterization features that may be utilized to both characterize articles and define interests of a user in a user interest profile. Furthermore, it is noted that a content feature can be manually assigned by an editor.

Existing approaches to building a user interest profile have been based on clicks or views of articles. However, a single click or pageview may or may not be representative of a user's actual interaction with an article. For example, a user may click on a link to an article, read the first few sentences and decide that they are not interested in reading the remainder of the article. In a click-based approach to profile building, such a situation will have the same representation as that in which the user clicked on the link and read the article in its entirety, because both situations resulted in a single recorded click or pageview. However, as noted above, methods and systems have been described for measuring the amount of time that a user dwells on a given article. In accordance with embodiments of the invention described herein, this dwell time can be applied to construct a more accurate user interest profile. In particular, it has been discovered that clicks may be weighted by the log of their corresponding dwell times, and the results may be applied to build an improved user interest profile.

With continued reference to FIG. 1, a dwell time analyzer 114 is configured to analyze data indicative of interactions by the user with an article, and determine the user's dwell time for a given article. This dwell time data is stored in a dwell time data storage 116. A profile builder 118 is configured to build or update a user interest profile based on the dwell time data for a given user. Various models can be applied to define user interest profiles. As described below, calculations according to various models may entail calculation of a logarithm. It is noted that in various embodiments, the logarithm may be the natural logarithm (logarithm to the base e), or may have any other base.

Figure 2:
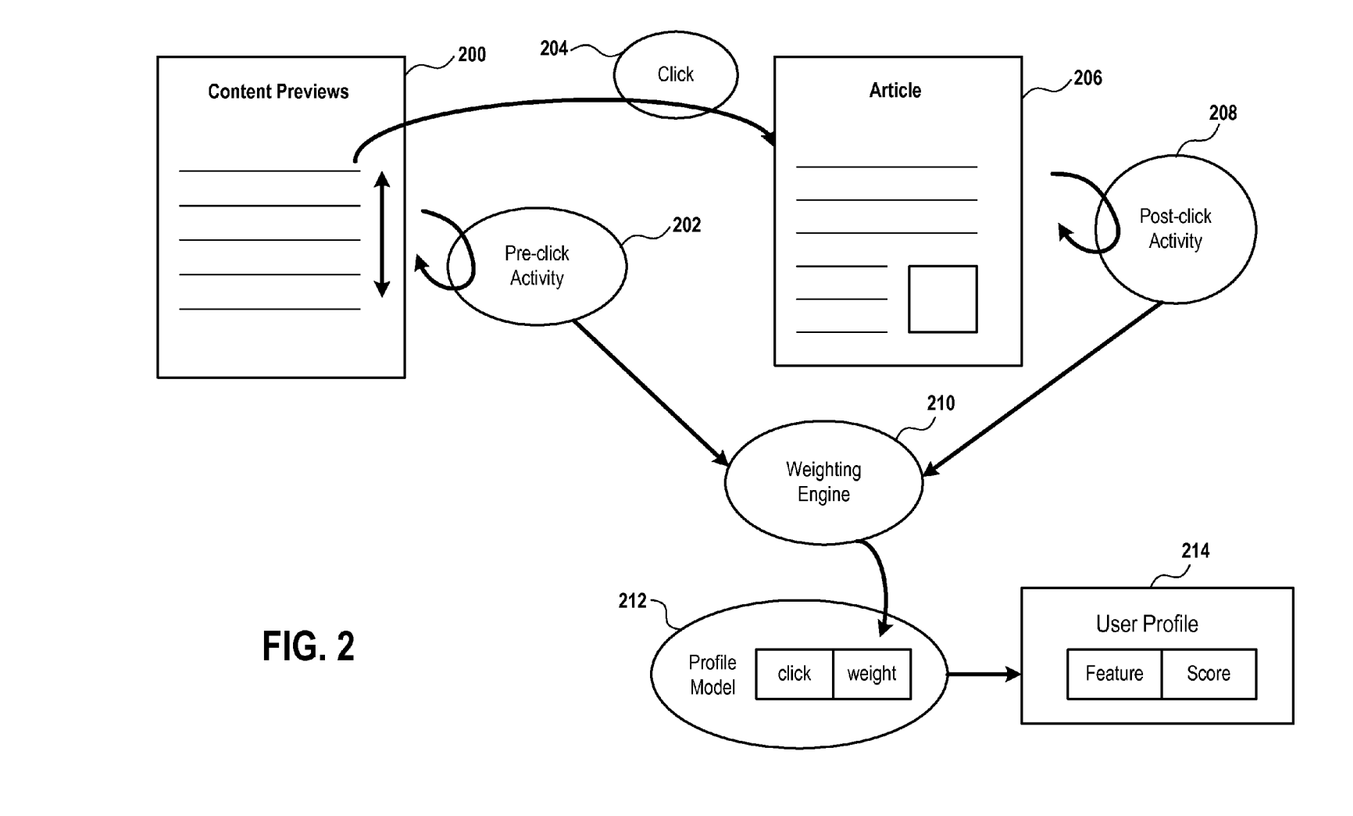
FIG. 2 conceptually illustrates the application of various factors to determine weights for clicks on particular content items for purposes of building a user interest profile, in accordance with an embodiment of the invention.

FIG. 2 conceptually illustrates the application of various factors to determine weights for clicks on particular content items for purposes of building a user interest profile, in accordance with an embodiment of the invention. In the illustrated embodiment, a plurality of content previews 200 are presented to a user. The content previews 200 may be presented in a scrollable stream, by way of example, such that the user may interact with the content previews through scrolling the presentation up and down so as to view different ones of the content previews. In this manner, pre-click activity 202 by the user can be determined, that is, interactions with the content previews such as scrolls of the stream, the maximum depth within the stream to which the user scrolls, the specific location of a content preview which the user ultimately clicks on, the amount of time that the user spends at any particular location within the stream, etc.

When the user is interested in viewing a particular content item based on seeing its preview, the user will click on the preview, or otherwise indicate selection of the preview (e.g. hitting a button designated for this purpose such as an enter key, gesturing in a particular direction, tapping on the preview, etc.) so as to access or navigate to the full presentation of the content item. In the illustrated embodiment, the user's click 204 on an article preview results in presentation of the full version of the article 206. Post-click activity of the user can be determined once the article 206 is presented to the user. By way of example, post-click activity may include the amount of time that the user spends viewing the article (article dwell time), the amount of time the user spends at any particular location within the article, the depth to which the user scrolls within the article, etc.

A weighting engine 210 applies the pre-click activity and/or the post-click activity of the user to determine a weight that will be applied to the click 204. In other words, the click on the article preview which resulted in presentation of the article 206 can be weighted up or down based on the user's pre-click activity and the user's post-click activity. A profile model 212 is applied to determine feature scores for various features based on the clicks and their associated weights which have been determined based on pre-click and/or post-click activity. The resulting user profile 214 thus defines various features and their associated scores, which indicate the relative interest level of the user for particular features.

One model for building a user interest profile defines a profile containing the smoothed normalized feature counts for all features that a user has seen. Where $n_{ij}$ is the number of times that a user i has clicked on items containing feature j, then for each feature that a user has seen, one can construct a user profile wherein the score $s_{ij}$ for each feature is defined as follows:

$$s_{ij} = \frac{n_{ij} + \alpha}{\sum_j n_{ij} + \beta}$$

In the above, $\alpha$ and $\beta$ are smoothing parameters. The score for a given feature is thus defined by the click count for that feature versus the combined click count for all features that the user has seen.

In accordance with embodiments of the invention, a dwell time based weight can be defined for a user i who reads an article m, as follows:

$$w_{im} = \log(T_{im} + 1)$$

wherein $T_{im}$ is the dwell time of a user i reading article m.

Accordingly, the cumulative weight of articles read by a user i containing feature j is the sum of $w_{im}$ over all articles that contain feature j, which can be represented as follows:

$$w_{ij} = \sum_{m_j} w_{im}$$

wherein $m_j$ is an article containing feature j.

Thus, in accordance with the previously described scoring methodology, a new user profile can be defined utilizing the dwell time-based weights, wherein the score $s_{ij}$ for each feature is defined as follows:

$$s_{ij} = \frac{w_{ij} + \alpha}{\sum_j w_{ij} + \beta}$$

wherein $\alpha$ and $\beta$ are smoothing parameters. The score for a given feature is thus defined by the total weight for that feature versus the combined total weight for all features that the user has seen.

A more nuanced user interest profile can be obtained by applying a sparse polarity model, which is better suited to identify features that are unique to the user rather than those that are popular among all users. For this model, a background probability of a user clicking on a given term j can be calculated as follows:

$$P_{+j} = \frac{\sum_i (n_{ij})}{\sum_{ij} (n_{ij})}$$

The expected clicks, $e_{ij}$, by a user i on term j is then:

$$e_{ij} = P_{+j} \sum_j (n_{ij})$$

As $P_{+j}$ is the probability of someone in the general population clicking on term j, which is multiplied by the total number of clicks by user i, $e_{ij}$ can be interpreted as the expected number of clicks on j by user i assuming the user/category affinity does not deviate from the general population.

A user affinity score can then be calculated as follows:

$$\lambda_{ij} = \frac{n_{ij} + k}{e_{ij} + k}$$

wherein k is a chi squared smoothing parameter. Ignoring the smoothing parameter k, it can be seen that $\lambda_{ij}$ represents a comparison between the actual number of clicks for user i on articles containing feature j and the expected number of clicks based on the probability in the general population.

Then, in order to remove terms from the user model that have an affinity score that is not significantly higher than that of the general population, a z-statistic can be computed as the log normalized affinity score divided by the standard deviation:

$$z = \frac{|\log(\lambda_{ij})|}{\sigma}$$

Then the final affinity scores are determined as follows:

$$\text{score} = (z > 1)?\ \log(\lambda_{ij}) : 0$$

In other words, if z is greater than one, then the score for the feature j is equal to the log of $\lambda_{ij}$, whereas if z is not greater than one, then the score for the feature is zero, which effectively eliminates the feature from the user profile.

For a dwell time based approach to the above-described sparse polarity implementation, the previously discussed weight $w_{ij}$ can be applied. The background probability of a user's weighted interaction on a given term j is thus determined as follows:

$$P_{+j} = \frac{\sum_i (w_{ij})}{\sum_{ij} (w_{ij})}$$

The expected weight, $e_{ij}$, by user i on term j is then determined as follows:

$$e_{ij} = P_{+j} \sum_j (w_{ij})$$

The user affinity score is then calculated as follows:

$$\lambda_{ij} = \frac{w_{ij} + k}{e_{ij} + k}$$

Ignoring the smoothing parameter k, it can be seen that $\lambda_{ij}$ represents a comparison between the actual total weight for user i on articles containing feature j and the expected total weight based on the probability in the general population.

The z-statistic and final feature score are determined as previously described. In this manner, a user profile is defined based on the user's measured dwell times for a given feature referenced against those of the general population of users for the same feature, so as to identify features for which the user's engagement level significantly exceeds that of the general population.

As discussed herein, there may be various feature types (e.g. categories, subjects, persons, locations, etc.). Therefore, in a related implementation of the (click-based) sparse polarity model, a given feature is analyzed in relation to its type (herein referred to as its "feature type").

The background probability of a user clicking on an article about feature j, wherein feature j's type is T(j), is determined as follows:

$$P_{+jT(j)} = \frac{\sum_i (n_{ij})}{\sum_i (n_{iT(j)})}$$

wherein $n_{ij}$ is the number of times that a user i reads an article about feature j, and wherein $n_{iT(j)}$ is the number of times that user i reads any article having the same type as that of feature j.

The expected clicks, $e_{ij}$, by a user i on term j is then:

$$e_{ij} = P_{+jT(j)} n_{iT(j)}$$

A user affinity score can then be calculated as follows:

$$\lambda_{ij} = \frac{n_{ij} + k}{e_{ij} + k}$$

wherein k is a chi squared smoothing parameter.

Then, in order to remove terms from the user model that have an affinity score that is not significantly higher than that of the general population, a z-statistic can be computed as the log normalized affinity score divided by the standard deviation:

$$z = \frac{|\log(\lambda_{ij})|}{\sigma}$$

wherein $$\sigma = \sqrt{\frac{1}{e_{ij} + k}}$$

Then the final affinity scores are determined as follows:

score=(z>1)? log($\lambda_{ij}$): 0

For a dwell time based approach to the presently-described sparse polarity implementation which accounts for feature type, the previously discussed weight $w_{ij}$ can be applied. The background probability of a user's weighted interaction on an article about feature j, wherein feature j's type is T(j), is determined as follows:

$$P_{+jT(j)} = \frac{\sum_i (w_{ij})}{\sum_i (w_{iT(j)})}$$

wherein $w_{ij}$ is the total weight of articles read by a user i containing feature j (calculated as the sum of $w_{im}$ over all articles m that contain feature j), and wherein $w_{iT(j)}$ is the total weight of articles read by user i having the same type as that of feature j.

The expected weight, $e_{ij}$, by a user i on term j is then:

$$e_{ij} = P_{+jT(j)} w_{iT(j)}$$

A user affinity score can then be calculated as follows:

$$\lambda_{ij} = \frac{w_{ij} + k}{e_{ij} + k}$$

Ignoring the smoothing parameter k, it can be seen that $\lambda_{ij}$ represents a comparison between the actual total weight for user i on articles containing feature j and the expected total weight based on the probability in the general population for the same feature type.

The z-statistic and final feature score are determined as previously described. In this manner, a user profile is defined based on the user's measured dwell times for a given feature referenced against those of the general population of users for the same feature and feature type, so as to identify features for which the user's engagement level significantly exceeds that of the general population.

Another approach to building a user profile for content recommendation is known as the TFIDF (term frequency inverse document frequency) model. An intermedia score for each user i and each feature j is calculated as follows:

$$r_{ij} = (n_{ij} + k) \log \left( 1 + \frac{\sum_i (n_{iT(j)}) + 1}{\sum_i (n_{ij}) + 0.5} \right)$$

The final interest score for each user i and each feature j is then determined as follows:

$$s_{ij} = \frac{r_{ij}}{\sum_j (r_{ij})}$$

For a dwell time based approach to the above-described TFIDF model, an intermedia score for each user i and each feature j is calculated as follows:

$$r_{ij} = (w_{ij} + k) \log \left( 1 + \frac{\sum_i (w_{iT(j)}) + 1}{\sum_i (w_{ij}) + 0.5} \right)$$

The final interest score for each user i and each feature j is then determined as previously described. In this manner, a dwell time based approach is provided for building a user interest profile applying the TFIDF model.

In additional embodiments, dwell time information can be combined with other information which is indicative of user engagement or interest. For example, in a scrollable context (e.g. a scrollable listing of article previews) scroll depth can be an indicator of user engagement, as described in U.S. application Ser. No. 13/836,758, filed Mar. 15, 2013, entitled "Method and System for Measuring User Engagement Using Scroll Dwell Time," which is incorporated by reference herein.

Figure 3:
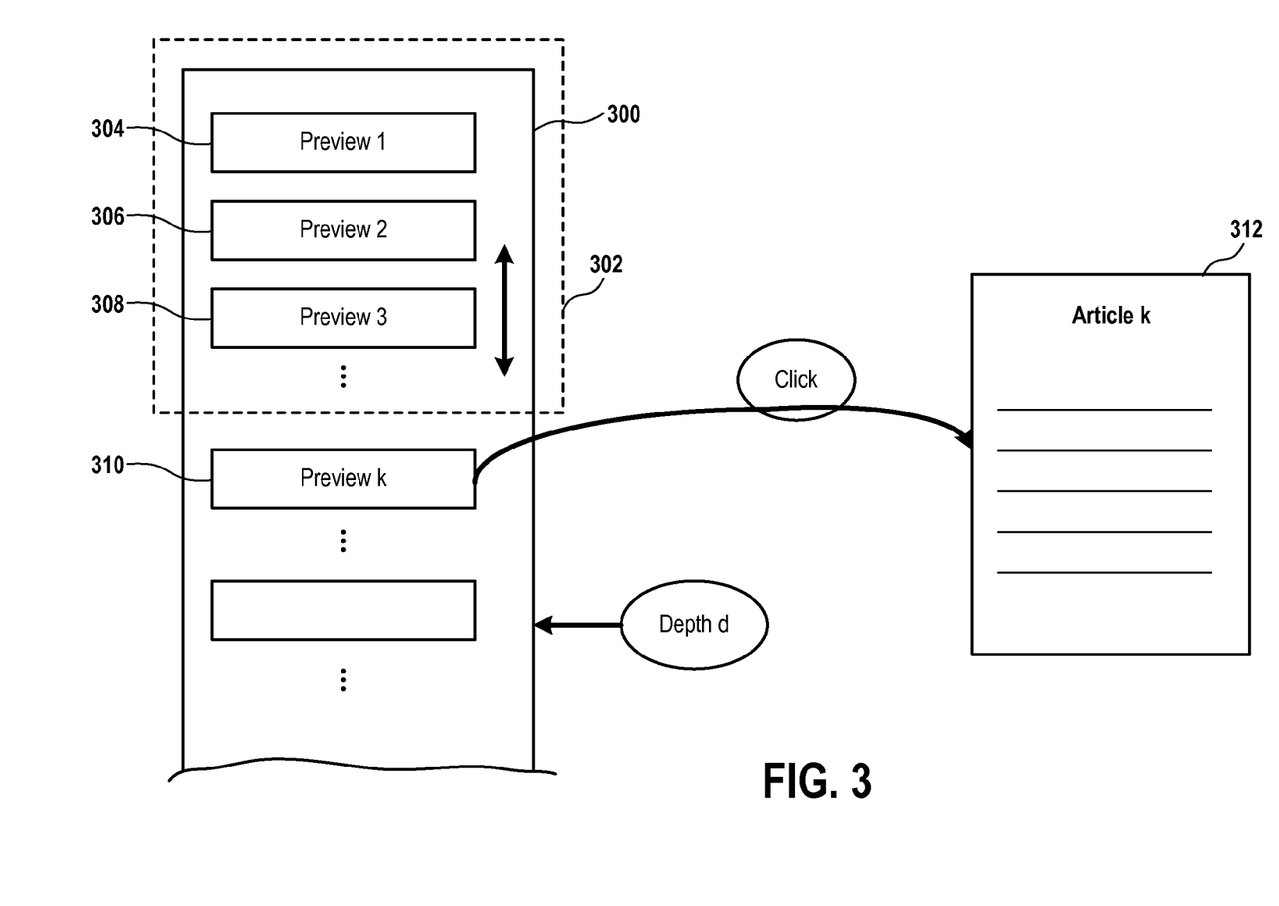
FIG. 3 illustrates a stream of article previews, in accordance with an embodiment of the invention.

FIG. 3 illustrates a stream of article previews, in accordance with an embodiment of the invention. As shown, a stream 300 of article previews includes various positions for presenting article previews. For example, at a first position 304, a first article preview is shown; at a second position 306, a second article preview is shown; and at a third position 308, a third article preview is shown. It should be appreciated that the stream 300 of article previews can be presented in a given context 302. The context 302 may be browser window, a display on a device, a frame within a larger web page, or any other context in which a scrollable stream of article previews may be presented and which enables interaction by the user to select ones of the article previews in the stream.

In one embodiment, the user clicks on an article preview located at a position k (shown at ref. 310) within the stream of article previews. As a result, a corresponding article k (shown at ref. 312) is presented to the user for viewing. Because the article preview at the position k appears in a stream of previews, its relative position within the stream is indicative of the user's interest level in features of the article. For example, if a user clicks on an article preview appearing at a lower position within the stream (e.g. corresponding to a higher numbered position; deeper or lower within the stream such that the user must scroll farther to reach it), then this may indicate greater interest on the part of the user for features of the corresponding article, as compared to an article preview appearing at a relatively higher position (e.g. lower numbered position, appearing at higher location) within the stream of article previews.

Additionally, the depth d to which the user scrolls the stream 300 may also indicate a relative level of interest. The depth d is the maximum depth of the stream to which the user scrolls or which the user otherwise views. Accordingly, the article weight can be boosted by the following:

$$1 + \ln\left(1 - \frac{1}{d} + \frac{k}{d}\right)$$

Accordingly, each viewed article's weight can be calculated as follows:

$$w_{im} = \ln(T_{im} + 1) * \left(1 + \ln\left(1 - \frac{1}{d} + \frac{k}{d}\right)\right)$$

In embodiments described herein, dwell times have been applied, as is, for purposes of determining a weight. However, in other embodiments, groups may be defined for dwell times which define ranges of dwell times that will be assigned the same value for purposes of determining the resulting weight. For example, dwell times from 0-5 seconds may be assigned a first value; dwell times from 5-15 seconds may be assigned a second value; dwell times from 15-30 seconds may be assigned a third value; etc. The various values are then applied to weight a corresponding click, as discussed above.

In another example, a weight can be calculated by taking the integer portion of the log of the dwell time, as follows:

$$w_{im} = \text{int}[\ln(T_{im}+1)]$$

The effect of this calculation is to define ranges wherein the weight for a dwell time ranging from zero to e is zero; the weight for a dwell time ranging from e to $e^2$ is one; the weight for a dwell time ranging from $e^2$ to $e^3$ is two; etc.

In yet another embodiment, the weight for a given range of dwell times could be assigned a negative value/weight. For example, a very low dwell time may be taken as an indication that the user disliked the content item, and therefore a negative weight may be applied for dwell times in a low range (e.g. zero to two seconds). With reference to the weight determination based on the integer portion of the log of the dwell time described above, a negative weight could be applied to the lowest range of dwell times (zero to e) by defining the weight as follows:

$$w_{im} = \text{int}[\ln(T_{im}+1)]-1$$

Figure 4:
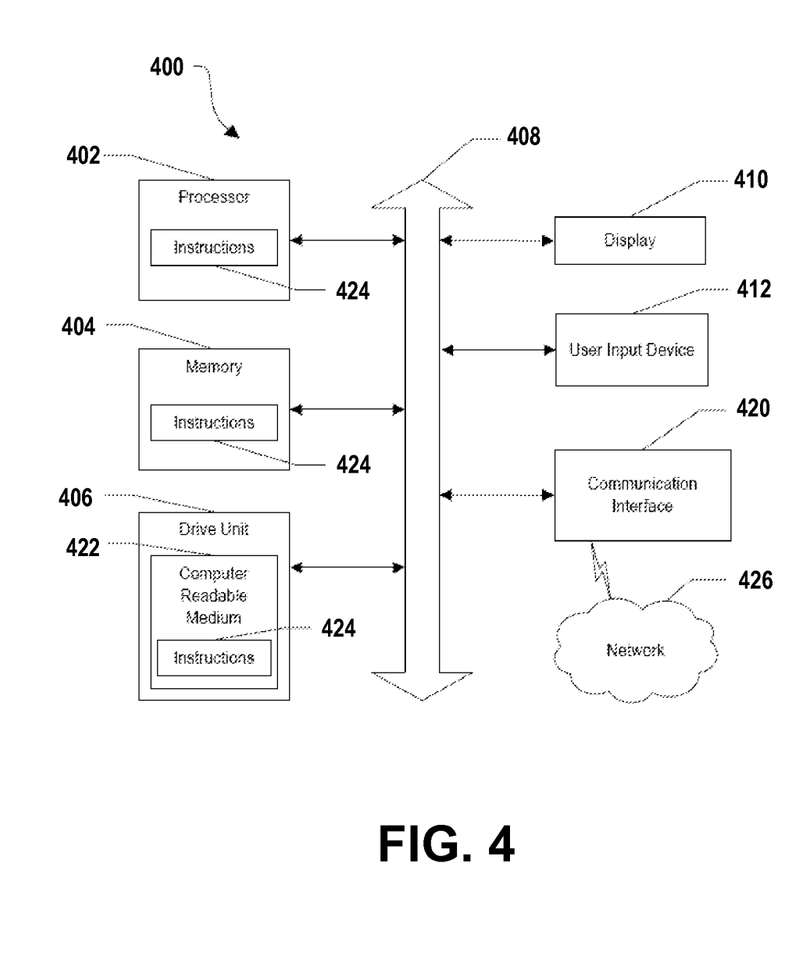
FIG. 4 illustrates an embodiment of a general computer system, in accordance with an embodiment of the invention.

FIG. 4 illustrates an embodiment of a general computer system designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 410, such as a liquid crystal display (LCD), an organic light emitting diode (OLED), a flat panel display, a solid state display, a cathode ray tube (CRT), a projector, a printer or other now known or later developed display device for outputting determined information. The display 410 may act as an interface for the user to see the functioning of the processor 402, or specifically as an interface with the software stored in the memory 404 or in the drive unit 416.

Additionally or alternatively, the computer system 400 may include an input device 412 configured to allow a user to interact with any of the components of system 400. The input device 412 may be a number pad, a keyboard, or a cursor control device, such as a mouse, or a joystick, touch screen display, remote control or any other device operative to interact with the computer system 400.

The computer system 400 may also or alternatively include a disk or optical drive unit 416. The disk drive unit 416 may include a computer-readable medium 422 in which one or more sets of instructions 424, e.g. software, can be embedded. Further, the instructions 424 may embody one or more of the methods or logic as described herein. The instructions 424 may reside completely or partially within the memory 404 and/or within the processor 402 during execution by the computer system 400. The memory 404 and the processor 402 also may include computer-readable media as discussed above.

In some systems, a computer-readable medium 422 includes instructions 424 or receives and executes instructions 424 responsive to a propagated signal so that a device connected to a network 426 can communicate voice, video, audio, images or any other data over the network 426. Further, the instructions 424 may be transmitted or received over the network 426 via a communication port or interface 420, and/or using a bus 408. The communication port or interface 420 may be a part of the processor 402 or may be a separate component. The communication port 420 may be created in software or may be a physical connection in hardware. The communication port 420 may be configured to connect with a network 426, external media, the display 410, or any other components in system 400, or combinations thereof. The connection with the network 426 may be a physical connection, such as a wired Ethernet connection or may be established wirelessly as discussed below. Likewise, the additional connections with other components of the system 400 may be physical connections or may be established wirelessly. The network 426 may alternatively be directly connected to the bus 408.

While the computer-readable medium 422 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 422 may be non-transitory, and may be tangible.

The computer-readable medium 422 can include a solid-state memory such as a memory card or other package that houses one or more non-volatile read-only memories. The computer-readable medium 422 can be a random access memory or other volatile re-writable memory. Additionally or alternatively, the computer-readable medium 422 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 400 may be connected to one or more networks 426. The network 426 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 426 may include wide area networks (WAN), such as the Internet, local area networks (LAN), campus area networks, metropolitan area networks, a direct connection such as through a Universal Serial Bus (USB) port, or any other networks that may allow for data communication. The network 426 may be configured to couple one computing device to another computing device to enable communication of data between the devices. The network 426 may generally be enabled to employ any form of machine-readable media for communicating information from one device to another. The network 426 may include communication methods by which information may travel between computing devices. The network 426 may be divided into sub-networks. The sub-networks may allow access to all of the other components connected thereto or the sub-networks may restrict access between the components. The network 426 may be regarded as a public or private network connection and may include, for example, a virtual private network or an encryption or other security mechanism employed over the public Internet, or the like.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for building a user interest profile, comprising:
    identifying features of each of a plurality of articles;
    for a given user, logging views of one or more of the plurality of articles, the one or more of the plurality of articles being provided by a content server over a network to a client device for viewing on the client device;
    for each view, measuring a corresponding dwell time for the view by the given user, wherein measuring the corresponding dwell time includes processing interaction data received over the network from the client device;
    for each view, applying a corresponding weight based on the corresponding measured dwell time, wherein applying the corresponding weight to each view uses a logarithm of the corresponding measured dwell time, such that a weighted view is separately determined for each single view of one of the articles;
    determining user interest scores for features of the one or more of the plurality of articles based on the weighted views;
    generating a user interest profile for the given user based on the user interest scores;
    wherein the method is executed by at least one processor.

2. The method of claim 1, wherein the dwell time for a view of a given article defines a measured amount of time spent by the given user during active viewing of the given article.

3. The method of claim 1, wherein the applying the weight to each view defines an increase or decrease in a value associated with the view that is based on the corresponding measured dwell time.

4. The method of claim 1, wherein the user interest score for a given feature defines a level of interest for the given feature by the given user.

5. The method of claim 1, wherein the user interest profile is defined by features of the one or more of the plurality of articles and their associated user interest scores.

6. The method of claim 1, wherein the identified features include one or more of categories, entities, persons, locations, subjects, teams.

7. The method of claim 1, further comprising,
    for a plurality of users, logging views of the plurality of articles;
    for each view by one of the plurality of users, measuring a corresponding dwell time for the view by the one of the plurality of users;
    applying a weight to each view by one of the plurality of users based on the corresponding measured dwell time of the one of the plurality of users, wherein applying the weight to each view by one of the plurality of users uses a logarithm of the corresponding measured dwell time of the one of the plurality of users;
    wherein determining user interest scores is based on the weighted views of the plurality of users.

8. The method of claim 7, wherein determining user interest scores includes,
    for a given feature, determining an overall probability that the plurality of users will view an article having the given feature;
    determining, for the given feature, an expected number of views by the given user based on the overall probability that the plurality of users will view an article having the given feature;
    determining an actual number of views of articles having the given feature by the given user;
    comparing the actual number of views to the expected number of views.

9. The method of claim 1, wherein applying the weight to a view of a given article is further based on a position of a corresponding preview for the given article in a preceding stream of previews from which the given article was selected.

10. The method of claim 1, wherein applying the weight to a view of a given article is further based on a depth to which a preceding stream of previews, from which the given article was selected, was scrolled.

11. A method for building a user interest profile, comprising:
    identifying features of each of a plurality of articles;
    for a given user, logging views of one or more of the plurality of articles, the one or more of the plurality of articles being provided by a content server over a network to a client device for viewing on the client device;
    for each view, measuring a corresponding dwell time for the view by the given user, wherein measuring the corresponding dwell time includes processing interaction data received over the network from the client device;

for each view, applying a corresponding weight based on the corresponding measured dwell time, wherein applying the corresponding weight to each view uses a logarithm of the corresponding measured dwell time, such that a weighted view is separately determined for each single view of one of the articles;

for a plurality of users, logging views of the plurality of articles, the one or more of the plurality of articles being provided by the content server over the network to client devices of the plurality of users for viewing on the client devices;

for each view by one of the plurality of users, measuring a corresponding dwell time for the view by the one of the plurality of users, wherein measuring the corresponding dwell time includes processing interaction data received over the network from a client device of the one of the plurality of users;

applying a weight to each view by one of the plurality of users based on the corresponding measured dwell time of the one of the plurality of users, wherein applying the weight to each view by one of the plurality of users uses a logarithm of the corresponding measured dwell time of the one of the plurality of users;

determining user interest scores for features of the one or more of the plurality of articles based on the weighted views, wherein determining user interest scores is based on the weighted views of the plurality of users, and wherein determining user interest scores includes, for a given feature, determining an overall probability that the plurality of users will view an article having the given feature;

determining, for the given feature, an expected number of views by the given user based on the overall probability that the plurality of users will view an article having the given feature;

determining an actual number of views of articles having the given feature by the given user;

comparing the actual number of views to the expected number of views; and generating a user interest profile for the given user based on the user interest scores.

12. The method of claim 11, wherein the dwell time for a view of a given article defines a measured amount of time spent by the given user during active viewing of the given article.

13. The method of claim 11, wherein the applying the weight to each view defines an increase or decrease in a value associated with the view that is based on the corresponding measured dwell time.

14. The method of claim 11, wherein the user interest score for a given feature defines a level of interest for the given feature by the given user.

15. The method of claim 11, wherein the user interest profile is defined by features of the one or more of the plurality of articles and their associated user interest scores.

16. The method of claim 11, wherein the identified features include one or more of categories, entities, persons, locations, subjects, teams.

17. A method for building a user interest profile, comprising:

identifying features of each of a plurality of articles;

for a given user, logging views of one or more of the plurality of articles, the one or more of the plurality of articles being provided by a content server over a network to a client device for viewing on the client device;

for each view, measuring a corresponding dwell time for the view by the given user, wherein measuring the corresponding dwell time includes processing interaction data received over the network from the client device, wherein the dwell time for a view of a given article defines a measured amount of time spent by the given user during active viewing of the given article;

for each view, applying a corresponding weight based on the corresponding measured dwell time, wherein applying the corresponding weight to each view uses a logarithm of the corresponding measured dwell time, such that a weighted view is separately determined for each single view of one of the articles;

for a plurality of users, logging views of the plurality of articles, the one or more of the plurality of articles being provided by the content server over the network to client devices of the plurality of users for viewing on the client devices;

for each view by one of the plurality of users, measuring a corresponding dwell time for the view by the one of the plurality of users, wherein measuring the corresponding dwell time includes processing interaction data received over the network from a client device of the one of the plurality of users;

applying a weight to each view by one of the plurality of users based on the corresponding measured dwell time of the one of the plurality of users, wherein applying the weight to each view by one of the plurality of users uses a logarithm of the corresponding measured dwell time of the one of the plurality of users;

determining user interest scores for features of the one or more of the plurality of articles based on the weighted views, wherein determining user interest scores is based on the weighted views of the plurality of users, and wherein determining user interest scores includes, for a given feature, determining an overall probability that the plurality of users will view an article having the given feature;

determining, for the given feature, an expected number of views by the given user based on the overall probability that the plurality of users will view an article having the given feature;

determining an actual number of views of articles having the given feature by the given user;

comparing the actual number of views to the expected number of views; and generating a user interest profile for the given user based on the user interest scores.

18. The method of claim 17, wherein the applying the weight to each view defines an increase or decrease in a value associated with the view that is based on the corresponding measured dwell time.

19. The method of claim 17, wherein the user interest score for a given feature defines a level of interest for the given feature by the given user.

20. The method of claim 17, wherein the user interest profile is defined by features of the one or more of the plurality of articles and their associated user interest scores;

wherein the identified features include one or more of categories, entities, persons, locations, subjects, or teams.

* * * * *